(12) United States Patent
Emmert et al.

(10) Patent No.: US 11,131,303 B2
(45) Date of Patent: Sep. 28, 2021

(54) POSITIVE DISPLACEMENT PUMP INCLUDING AN UNLOADING DEVICE

(71) Applicant: DEERE & COMPANY, Moline, IL (US)

(72) Inventors: Robert C. Emmert, Waverly, IA (US); Thomas W. Butts, Jesup, IA (US)

(73) Assignee: DEERE & COMPANY, Moline, IL (US)

( * ) Notice: Subject to any disclaimer, the term of this patent is extended or adjusted under 35 U.S.C. 154(b) by 168 days.

(21) Appl. No.: 16/429,341

(22) Filed: Jun. 3, 2019

(65) Prior Publication Data

US 2019/0285068 A1  Sep. 19, 2019

Related U.S. Application Data

(63) Continuation of application No. 15/139,428, filed on Apr. 27, 2016, now Pat. No. 10,309,396.

(51) Int. Cl.
*F04C 2/14* (2006.01)
*F04C 14/26* (2006.01)
(Continued)

(52) U.S. Cl.
CPC .............. *F04C 2/14* (2013.01); *F04C 14/265* (2013.01); *F04C 15/0026* (2013.01);
(Continued)

(58) Field of Classification Search
CPC .... F01C 21/0863; F04C 14/265; F04C 14/18; F04C 15/0038; F04C 2/102; F04C 15/0026; F04C 2/14
See application file for complete search history.

(56) References Cited

U.S. PATENT DOCUMENTS 2,622,534 A * 12/1952 Johnson ................... F04C 2/14
418/126
2,627,232 A * 2/1953 Lauck ..................... F15B 11/02
137/565.35
(Continued)

FOREIGN PATENT DOCUMENTS

EP   0112008 A1   6/1984

OTHER PUBLICATIONS

German Search Report, German Patent and Trademark Office, German Patent Application No. 10 2017 207 010.2, dated Jan. 23, 2018, 10 pages.
(Continued)

*Primary Examiner* — Anthony Ayala Delgado
(74) *Attorney, Agent, or Firm* — Taft Stettinius & Hollister LLP; Stephen F. Rost

(57) ABSTRACT

A fluid transfer pump that has a housing, a body portion movable within the housing between a first position and a second position, a gear coupled to the housing, a body cavity defined partially between the body portion and the housing, and an aperture defined in the housing that selectively provides a fluid to the body cavity. When the fluid is applied to the body cavity at or above a pilot pressure, the body portion is in the first position adjacent to the gear and when the fluid is applied to the body cavity at a fluid pressure lower than the pilot pressure, the body portion is in the second position and spaced from the gear.

12 Claims, 5 Drawing Sheets

(51) Int. Cl.

| | |
|---|---|
| *F04C 15/00* | (2006.01) |
| *F04C 2/10* | (2006.01) |
| *F04D 13/12* | (2006.01) |
| *F16D 31/04* | (2006.01) |
| *F01C 21/08* | (2006.01) |
| *F04C 14/18* | (2006.01) |

(52) U.S. Cl.
 CPC ...... *F04C 15/0038* (2013.01); *F01C 21/0863* (2013.01); *F04C 2/102* (2013.01); *F04C 14/18* (2013.01); *F04C 14/26* (2013.01); *F04D 13/12* (2013.01); *F15B 2211/20553* (2013.01); *F15B 2211/46* (2013.01); *F16D 31/04* (2013.01)

(56) References Cited

U.S. PATENT DOCUMENTS

| | | | |
|---|---|---|---|
| 2,876,705 A | 3/1959 | Aspelin | |
| 2,915,977 A | 12/1959 | Campbell | |
| 2,956,512 A | 10/1960 | Brundage | |
| 3,292,847 A | 12/1966 | Herrick | |
| 3,635,602 A * | 1/1972 | Grennan | F04C 14/02 417/201 |
| 7,544,052 B2 | 6/2009 | Wockel | |
| 2010/0086422 A1 | 4/2010 | Shinozaki | |
| 2012/0244027 A1* | 9/2012 | Watanabe | F04C 14/185 418/166 |

OTHER PUBLICATIONS

Gear pumps Deere FOS-10 p. 2-3.

* cited by examiner

POSITIVE DISPLACEMENT PUMP INCLUDING AN UNLOADING DEVICE

RELATED APPLICATIONS

This application is a continuation application of U.S. application Ser. No. 15/139,428, filed Apr. 27, 2016, the disclosure of which is hereby incorporated by reference.

FIELD OF THE DISCLOSURE

The present invention generally relates to a work vehicle having a fluid management system, and more particularly to a pump for moving fluid through the fluid management system.

BACKGROUND

Agricultural equipment, such as a tractor or a self-propelled combine-harvester, includes a prime mover which generates power to perform work. In the case of a tractor, the prime mover is a gas powered engine or a diesel engine that generates power from a supply of fuel. The engine drives a transmission which moves wheels or treads to propel the tractor, or other work vehicles, across ground or other surfaces. In addition to providing power to wheels through a transmission, tractors often include a power takeoff (PTO) which includes a shaft coupled to the transmission and which is driven by the engine or a hydraulic motor.

Both gas powered and diesel powered vehicles includes a fluid management system to manage the movement of a hydraulic fluid in the transmission. In different embodiments, the fluid management system manages the movement of fluid to other vehicle systems and components including a differential, a steering system, brakes, the PTO, and various fluid reservoirs and coolers. Other systems and components which use the managed fluid include a suspension, a hitch, a cab suspension, and selective control valves.

Fluid management systems typically include a positive displacement pump which transfers the fluid between different portions of the fluid management system, for instance between a differential and a hydraulic reservoir. In one known configuration, the hydraulic system and the drivetrain share the hydraulic fluid and the drivetrain system circulates fluid through a fluid cooler. In one embodiment, a transfer pump, typically a gear pump, moves the common fluid from the differential case to the hydraulic reservoir through a hydraulic filter.

Energy losses occur throughout the drivetrain when the vehicle is moving or standing still. This energy loss, also known as a parasitic loss, is a result of many factors including the movement of oil in the system which exceeds the flow requirements. The excess flow is returned to a reservoir or a transmission sump, and is consequently not converted to perform a function but instead results in lost energy.

Transfer pumps under different operating conditions can be a source of these parasitic losses, even when the vehicle's engine is idling. Attempts to reduce the parasitic losses of positive displacement pumps have been provided by the use of additional devices such as expensive clutches, external unloading valves, large unloading valves, piston pumps, and variable displacement mechanisms for vane pumps. These solutions, however, still develop pressure losses. Consequently, what is needed therefore is a transfer pump that further reduces parasitic losses without the use of costly additional devices or the additional complexity associated with such devices.

SUMMARY

A transfer pump is configured to move a hydraulic fluid in a hydraulic fluid management system of a hydraulic system of a vehicle including a transmission. In one embodiment, the transfer pump moves the fluid from a differential case to a hydraulic reservoir coupled to the transmission. The transfer pump is a positive displacement pump including an unloading device, such as a plate, that is resiliently biased in the pump during a normal operation but is moved away from the pumping gears upon the application of a pilot pressure. The result is an open chamber defining a volume for the pump gears to turn without developing pressure, to thereby reduce parasitic losses. In another embodiment, the plate is resiliently biased away from the pump during normal operation, but is move toward the pump upon the application of a pilot pressure.

In one embodiment, there is provided a fluid transfer pump including a housing defining a first cavity and a passage operatively coupled to a second cavity. The passage is configured to provide fluid transfer into the second cavity. The housing further includes an interior wall disposed in the housing and a fixed side wall disposed at an end of the housing. A movable member is movably disposed within the housing and a bias element is disposed between the wall and the movable member. A fluid applied to the passage into the second cavity changes the bias force of the bias element and the location of the movable member with respect to the interior wall to change a volume of the first cavity.

In another embodiment, there is provided a fluid transfer pump including a housing defining a cavity and a passage having an inlet disposed at an external portion of the housing. A movable member is disposed within the cavity. The movable member defines a first chamber, wherein the volume of the first chamber is adjustable with movement of the movable member. A gear set is disposed at the first chamber, wherein the first chamber is configured to hold a fluid. A bias element is disposed at the movable member and is configured to adjust the location of the movable member to a first position defining a first volume of the first chamber and to a second position defining a second volume of the first chamber.

In still another embodiment, there is provided a method of controlling the operation of a fluid transfer pump having a housing, defining a cavity, and including a bearing, located at the cavity. The method includes: biasing an adjustable plate disposed within the cavity at a first location with a bias element; and applying a fluid pressure to the adjustable plate to adjust the bias of the bias element and to move the adjustable plate away from the bearing to a second location.

BRIEF DESCRIPTION OF THE DRAWINGS

The above-mentioned aspects of the present invention and the manner of obtaining them will become more apparent and the invention itself will be better understood by reference to the following description of the embodiments of the invention, taken in conjunction with the accompanying drawings, wherein.

DETAILED DESCRIPTION

Figure 1:
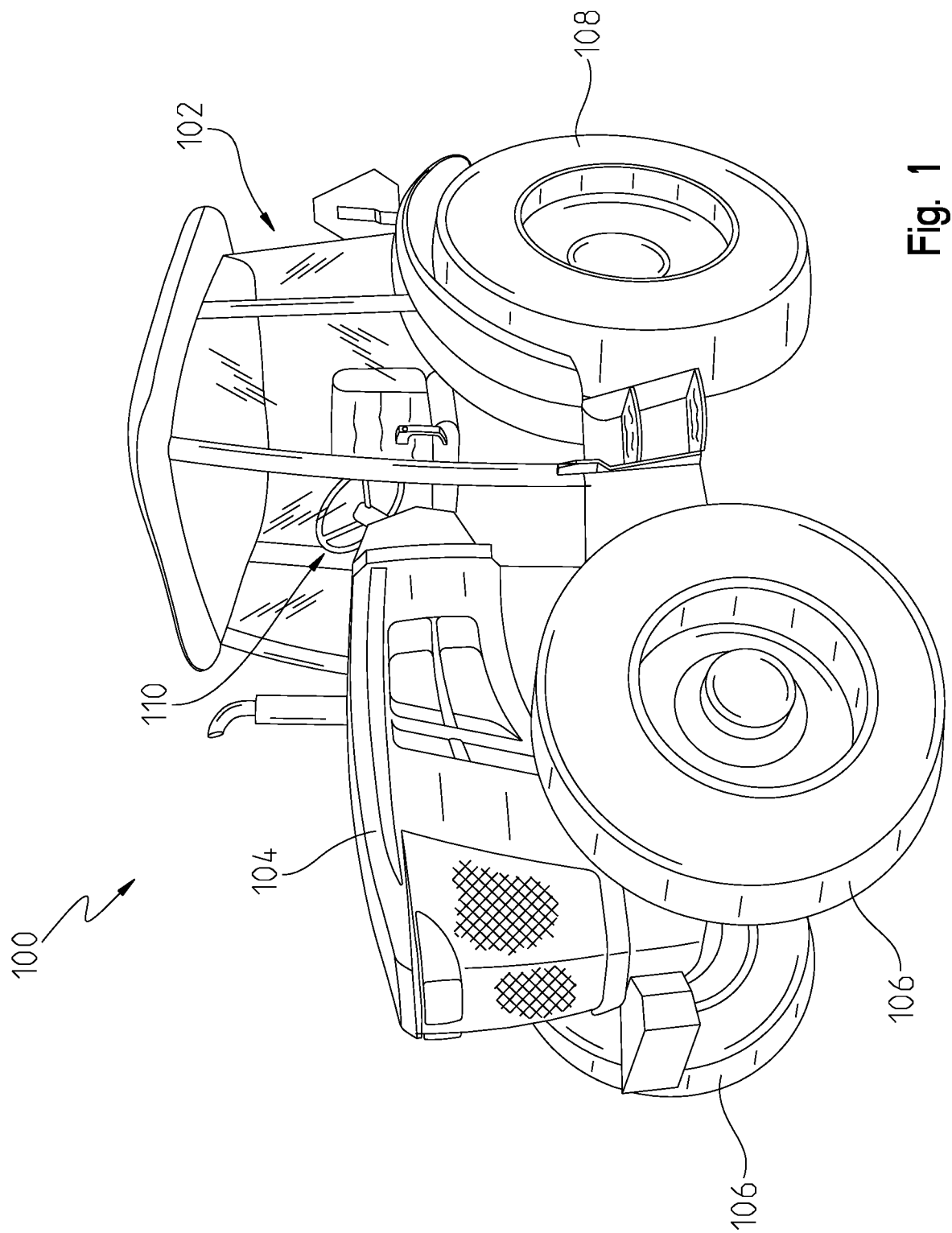
FIG. 1 is a side perspective view of a work vehicle.

For the purposes of promoting an understanding of the principles of the novel invention, reference will now be made to the embodiments described herein and illustrated in the drawings with specific language used to describe the same. It will nevertheless be understood that no limitation of the scope of the novel invention is intended. Such alterations and further modifications of the illustrated apparatus, assemblies, devices and methods, and such further applications of the principles of the novel invention as illustrated herein, are contemplated as would normally occur to one skilled in the art to which the novel invention relates.

The present disclosure is not exclusively directed to any type of machine, but rather extends to different types powered vehicles, including work vehicles such as tractors. For exemplary and illustrative purposes, the present disclosure focuses on a utility tractor 100. In FIG. 1, for example, the tractor 100 includes a cab 102 where an operator controls the operation of the tractor 100. The tractor 100 includes an outer frame 104 to which a front and rear axle (not shown) are connected. The front axle engages a pair of front ground engaging means 106 (e.g., wheels) mounted thereto and the rear axle engages a pair of rear ground engaging means 108 (e.g., wheels) mounted thereto. Operator controls 110, such as a steering wheel, shift lever, shift buttons, dashboard display, etc., are disposed in the cab 102. One or more of these operator controls 110 is operably coupled to the machine's drive train, including a transmission (not shown) for controlling the operation of the machine 100. A fluid system 200 (see FIG. 2) is supported by the frame 104 and provides a fluid, such as a hydraulic fluid, to provide for the operation of the transmission of the machine 100 as well as a power take off (PTO) not shown.

Figure 2:
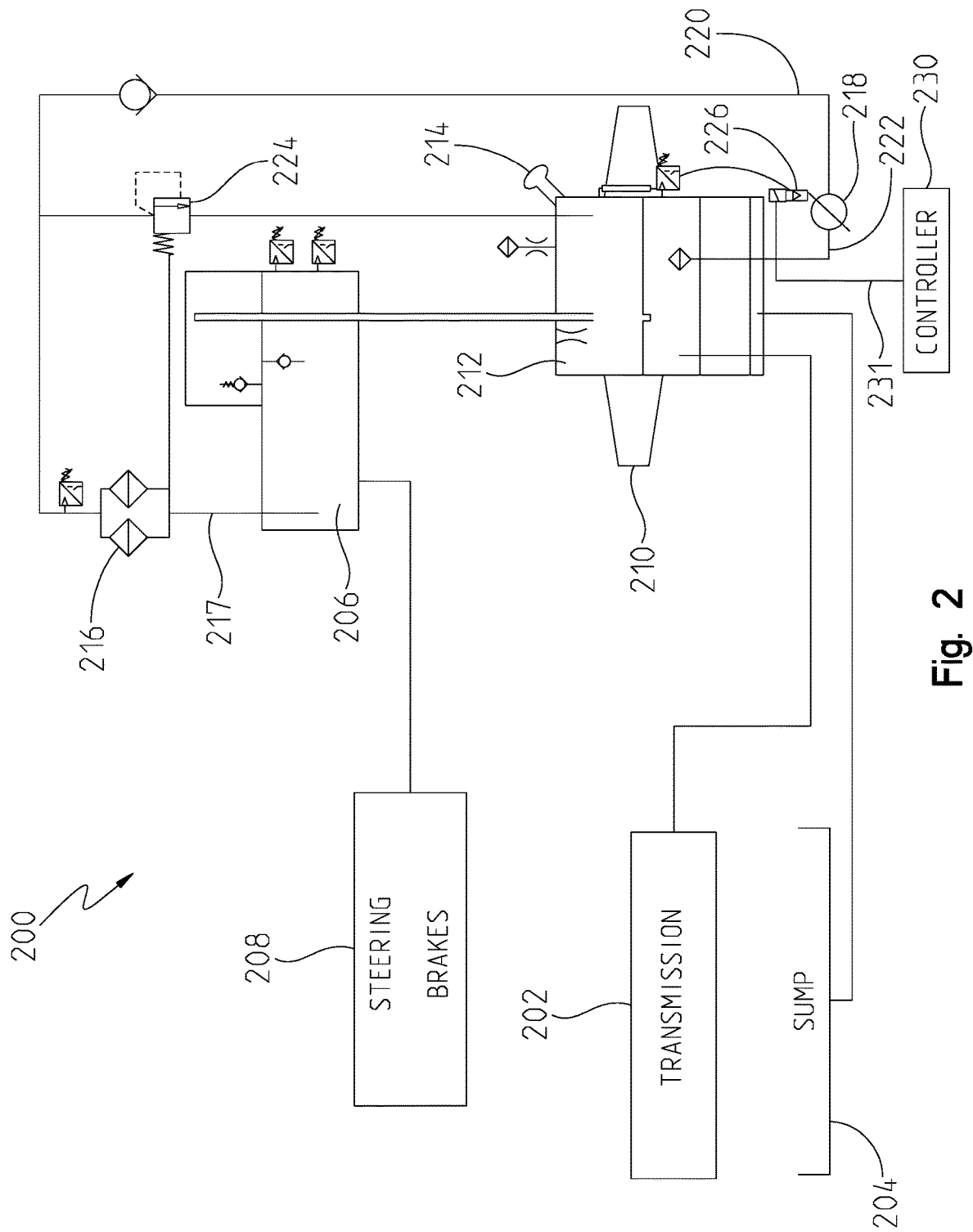
FIG. 2 is a block diagram of a fluid management system of a work vehicle.

As illustrated in FIG. 2, the fluid system 200 includes a transmission 202 and a transmission sump 204 operatively connected to the transmission 202. The sump 204, in one embodiment, is also coupled to provide fluid to lubricate a front axle, a PTO, and the front brakes. A cooler (not shown) is coupled to the transmission 202, as is understood by those skilled in the art.

A fluid reservoir 206 provides for the storage of fluid used in the fluid system 200 and is coupled to steering and brakes 208. A differential 210 includes a differential case 212 which is coupled to the reservoir 206. An oil fill 214 is located at the case 212 to provide for filling of the oil of the differential case 212 as necessary. One or more filters 216 are coupled between a port 217, of the reservoir 206, and a transfer pump 218, which is coupled to the differential case 212. An inlet 220 of the pump 218 is configured to receive filtered oil which moves through the filter 216. An outlet 222 is coupled to the differential 212. A bypass solenoid control valve 224 is coupled between the port 217 and the differential case 212.

The pump 218, in one embodiment, is a low pressure gear pump configured to transfer oil between the reservoir 206 and the differential case 212. The pump's pressure building capability is controlled by electrohydraulic or hydraulic control of plate movement and an electrical control signal as indicated at 226. In one embodiment, a solenoid is located at, within, or distant from the pump 218. The electrical control signal is provided by a controller 230, through a control line 231 which includes one or more processors which are configured to control the operation of the pump 218. The electrical control signal controls the solenoid which opens or closes a hydraulic pilot signal to be applied to the pump 218.

The controller 230 is configured to execute or otherwise rely upon computer software applications, components, programs, objects, modules, or data structures, etc. Software routines reside in a memory, resident within the controller or at other external memory (not shown), or are provided as firmware, and executed in response to the various signals received and generated as described herein. The executed software includes one or more specific applications, components, programs, objects, modules or sequences of instructions typically referred to as "program code". The program code includes one or more instructions located in the memory, other storage devices or elsewhere, which executes the control functions of the vehicle 100.

Figure 3:
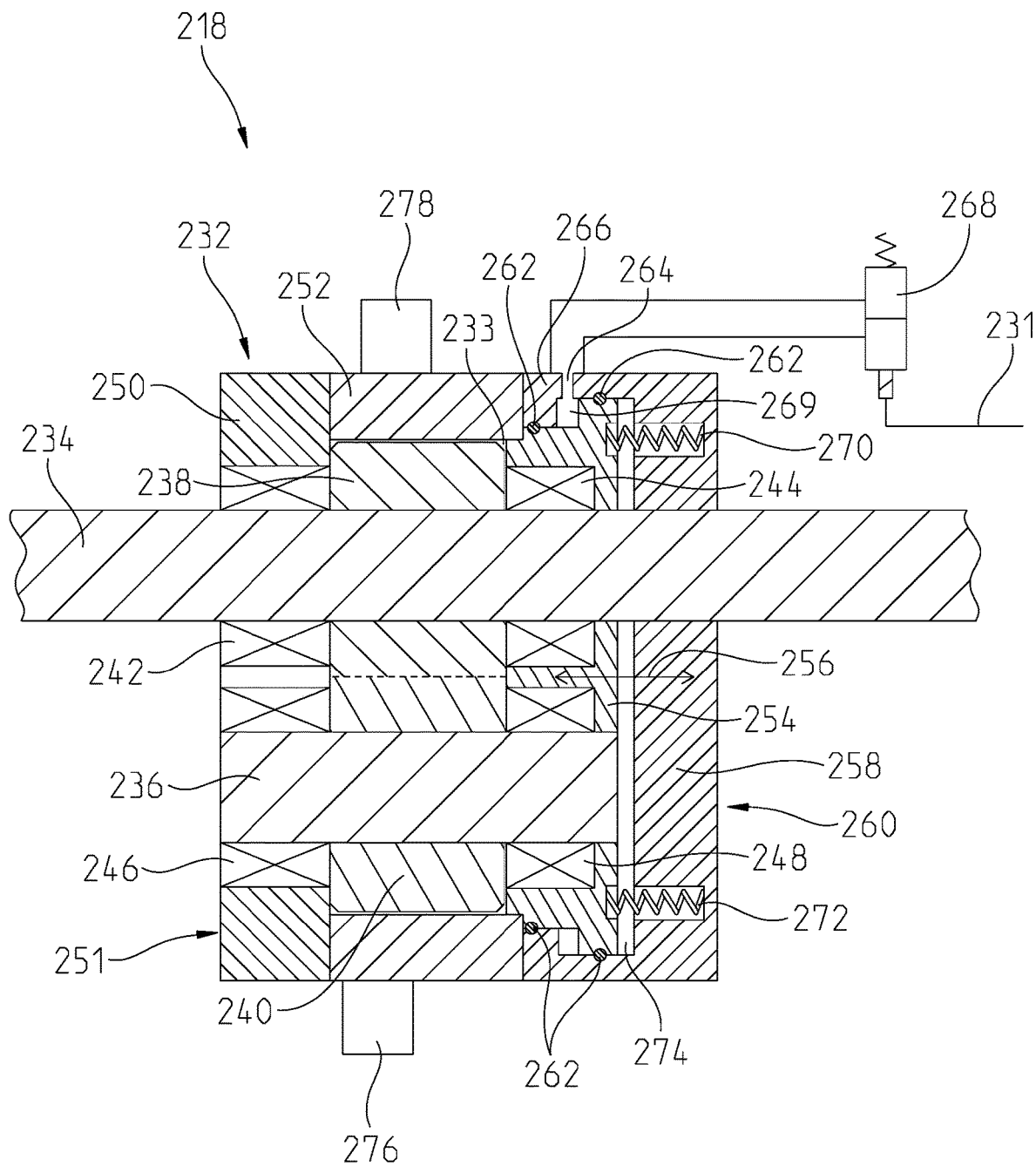
FIG. 3 is a schematic diagram of cross-section of one embodiment of a positive displacement pump in a first condition.
Figure 4:
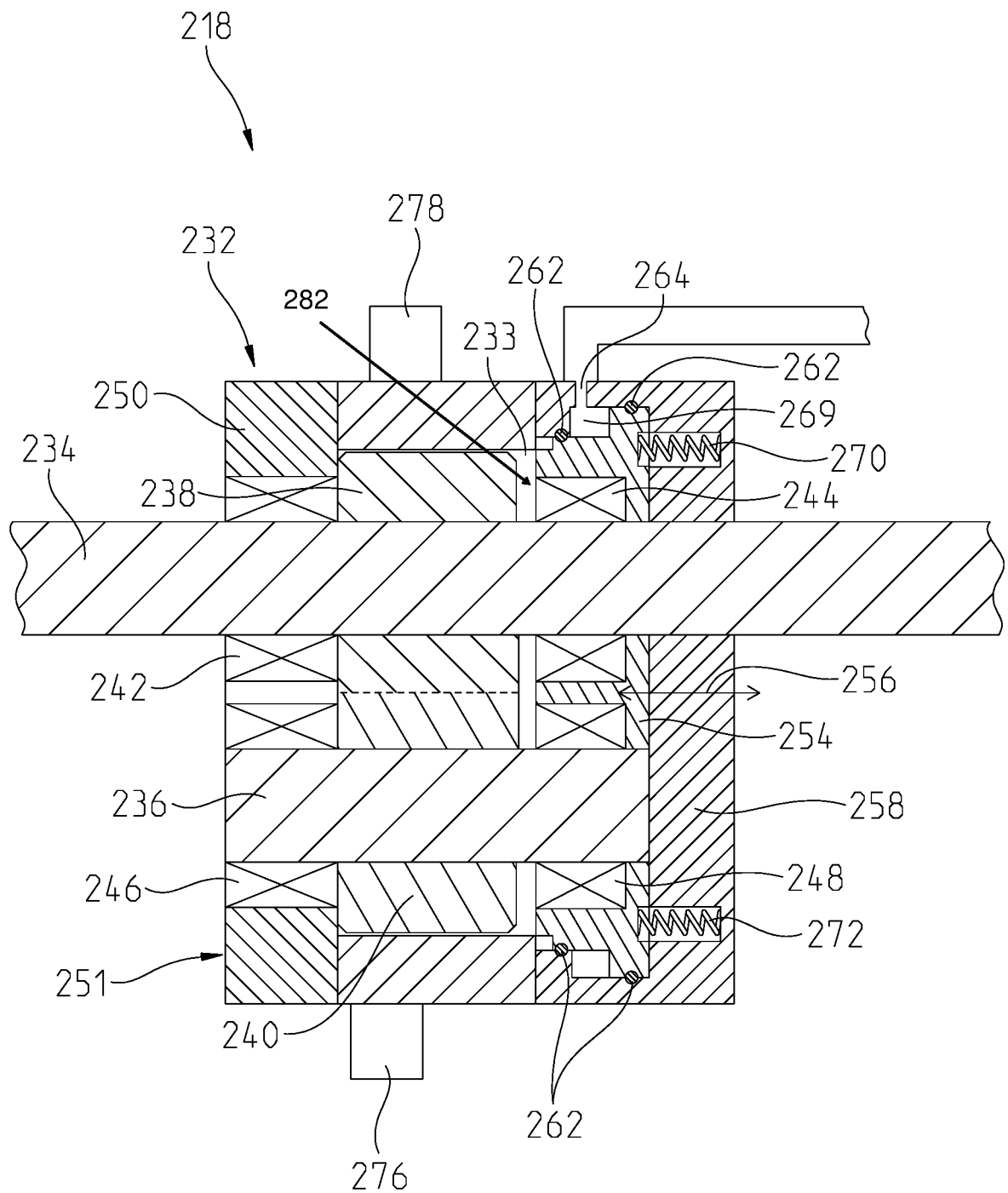
FIG. 4 is a schematic diagram of a cross-section of one embodiment of a positive displacement pump in a second condition.

FIG. 3 and FIG. 4 are a schematic diagram of cross-section of one embodiment of pump 218 in a first state and a second state respectively. In the illustrated embodiments, the pump 218 is a positive displacement pump which includes a housing 232 defining a cavity 233 having disposed therein a first shaft 234 and a second shaft 236. The shaft 236 includes first and second ends, each of which extend externally to the housing 232. The shaft is configured to be driven by a driver (not shown). A first gear 238 is fixed to and encircles the shaft 234 and a second gear 240, which engages the first gear 238, is fixed to and encircles the shaft 236.

The first shaft 234 is supported for rotational movement within the cavity by a first bearing 242 and a second bearing 244. The second shaft 236 is supported for rotational movement by a third bearing 246 and a fourth bearing 248. The first and third bearings 242 and 246 are disposed next to or at a flange 250 which forms a sidewall 251 of the housing 232. A casing 252 forms a portion of the housing 232 and is disposed adjacently to the sidewall 251. The bearings 242 and 246 form fluid tight seals with the shafts 234 and 236 to substantially seal the cavity 233 at the sidewall 251.

Each of the second bearing 244 and the fourth bearing 248 are disposed within an end plate 254, which is movable with respect to the casing 252 along a direction 256, in either direction. The second and fourth bearings 244 and 248 are fluidically sealed within the end plate 254. The end plate 254, which moves in the direction 256, is fluidically sealed with an end cover 258, such that the end plate 254 moves between a first position of FIG. 3 to a second position of FIG. 4 and at locations between the first and second positions. The end cover 258 provides another sidewall 260 to complete the housing 232. Fluidic sealing of the end plate 254 with the end cover 258 is made by a plurality of seals 262 each of which is located at an interface of the end plate 254 and the end cover 258.

The end cover 258 defines with an aperture 264 with the casing 252. In the illustrated embodiment, a casing part 266 is a separable part which is fixedly attached to the rest of the casing 252. In other embodiments, the casing 252 is single piece unitary part. The aperture 264 is fluidically coupled to a solenoid 268 which is controlled by the controller 230 through the line 231. The aperture 264 is further fluidically coupled to a cavity 269, the capacity of which varies as a function of end plate 254 moving with respect to the gears 242 and 246.

As pilot pressure is applied by the solenoid 268, the cavity 269 expands as the end plate 254 moves away from the gears 242 and 246 and which forms an inside wall or an inside surface. At the same time, the cavity 233, which defines a volume, expands as well as the end plate 254 moves away from the gears 242 and 246. The capacity of the cavity 233 varies as a function of the position of the end plate 254 with respect to the bearings 238 and 240.

A first bias element 270 and a second bias element 272 are each located between the end plate 254 and the end cover 258. In different embodiments, one or more bias elements are included. In one embodiment, the first and second bias elements 270 and 272 are helical springs, each having ends engaging a groove or an aperture in the end plate 254 and the end cover 258. Each of the bias elements 270 and 272, in a relatively uncompressed state as illustrated in FIG. 3, forces the end plate 254 away from the end cover 258 to reduce the capacity of the cavity 233. In this position, there is no pilot pressure applied through the aperture 264. In the absence of pilot fluid pressure being provided at the aperture 264, the force provided by the bias elements 270 and 272 is sufficient to maintain the position of the end plate 254, as illustrated, which reduces the size of cavity 233 to a minimum. In addition, a space 274, located between the end plate 254 and the end cover 258, is at a maximum. In this condition, the pump 218 moves fluid from an inlet 276 to an outlet 278, both of which are fluidically coupled to the cavity 233. A working pressure for the operation of the gears 238 and 240 is therefore developed. With the end cover 258 in the illustrated position, the pressure developed within the cavity 233 enables the shaft 234 to move the fluid from the inlet 276, through the cavity 233, through the outlet 278, and to other locations within the fluid system 100. The end clearances of each of the components are controlled in order to achieve an acceptable pumping efficiency.

FIG. 4 illustrates a state of the pump 218 which is provided to reduce the fluid pressure in the cavity 233 and to unload the gears 238 and 240 when no fluid flow and a low energy state are desired. In this condition, power and/or fuel are saved to thereby reduce costs including operating costs and costs of repair or replacement from use.

To unload the pump 218, a pilot pressure is applied to the aperture 264 through activation of the solenoid 268 by the controller 230. Upon application of the pilot pressure, fluid is forced into the cavity 269 defined between the housing casing 252 and the end plate 254. With sufficient pressure to overcome the bias force of the bias member 270 and 272, the space 280 fills with fluid to force the end plate 254 to move away from the gears 238 and 240. This movement reduces the size of the space 274.

As the space 274, of FIG. 3, is reduced in size, a space 282, which is part of the cavity 233, expands between the gears 238 and 240 and the end plate 254 as the combined structure of the second bearing 244, the fourth bearing 248, and the end plate 254, moves towards the end cover 258. As the bias elements are compressed to a shorter length, the end clearance of the gear set is increased to a point where the gears 238 and 240 no longer provide sufficient working pressure for moving fluid from the inlet 276 to the outlet 278. When the pilot pressure is applied, the pressure is trapped between the seals 262 near the aperture 264, and this pressure is applied to the differential area of the end plate to push against the springs. Consequently, the gears run in the oil filled chamber, the cavity 233, which now has a larger capacity, and which lacks sufficient pressure to move fluid under pressure from the inlet 276 to the outlet 278. During this state of operation, the operating pressure of the pump is essentially zero and the only power required is the torque required to turn the gears in an oil bath.

In this embodiment, should a fault occur, the space 274 remains as depicted in FIG. 3 and sufficient pressure is applied within the cavity 233 to enable pressurized fluid flow from the inlet 276 to the outlet 278. Faults can occur under different conditions, including failure of the solenoid 268 to operate or a decoupling of a fluid line from the aperture 264.

Figure 5:
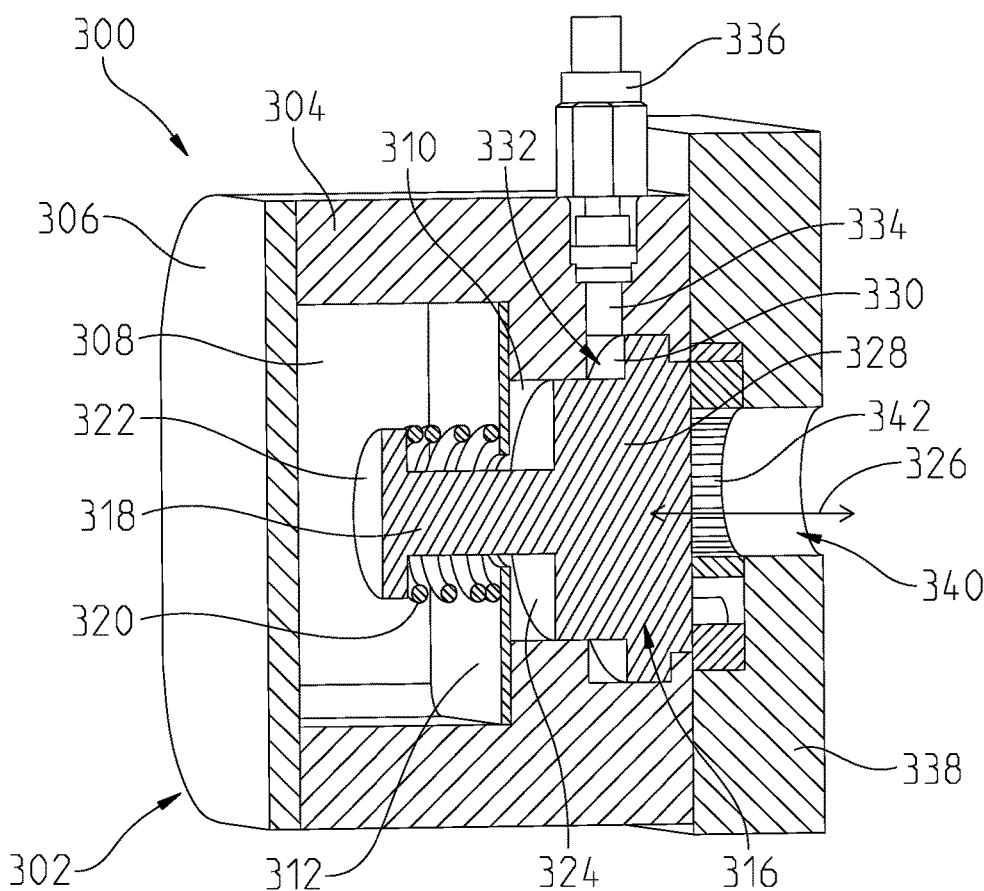
FIG. 5 is a schematic diagram of a cross-section of another embodiment of a positive displacement pump.
Figure 6:
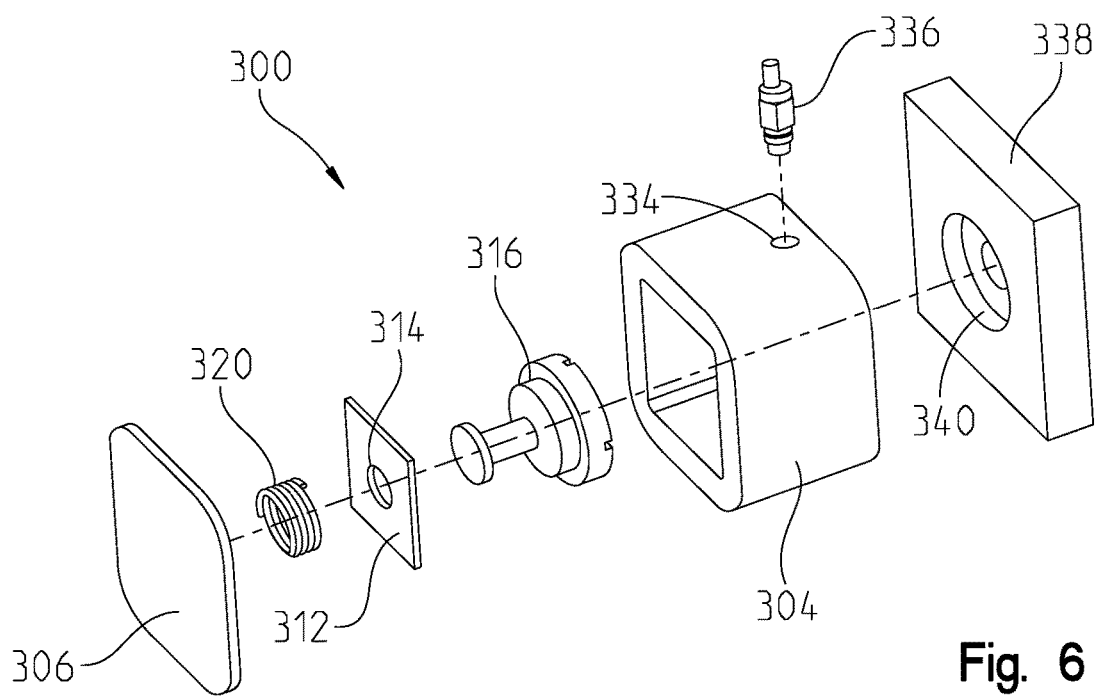
FIG. 6 is a schematic diagram of an exploded view of the embodiment of the positive displacement pump of FIG. 5.

FIG. 5 illustrates another embodiment of a pump 300 which includes a housing 302 having a case 304 and a cover 306 fixedly located at one end of the case 304. The case 304 includes a first cavity 308 and a second cavity 310 separated by an inside wall 312. The first cavity 308 is substantially closed by the cover 306, inside walls of the case 304, and one side of the wall 312, which acts a spring retainer. The wall 312 includes an aperture 314 through which a ring plunger 316 is inserted.

A bias member 320 is located on a shaft 318 and is captured between a terminating end 322, which defines a retaining portion at one end of the bias member 320. A surface of the wall 312 provides another retaining portion at another end of the bias member such that the bias member is captured between the terminating end 322 and the wall 312.

The second cavity 310 is further defined by a first surface 324 of the ring plunger 316 which interfaces with a second surface of the wall 312 to define the second cavity 310. The second cavity 310 includes a variable volume, the volume of which is adjustable as a function of movement of the ring plunger 316 along a direction 326, in either direction. A body portion 328 of the plunger 316 defines the first surface 324 and a second surface 330. The second surface 330 defines with adjacent walls of the case 304 a third cavity 332, which has a generally ring shaped volume extending around the body portion 328. The third cavity 332 is coupled to an aperture 334 defined by the case 304 which is configured to receive a fitting 336. The fitting 336 receives a pilot pressure as described above with regard to FIGS. 3 and 4.

In this embodiment, however, the application of a pilot pressure at the aperture 334 moves the ring plunger 316 away from the wall 312 and toward a pump housing 338, which provides a sidewall for the housing and which is fixedly attached to the case 304. The pump housing 338 includes a central channel 340 configured to support a gear 342. Upon application of the pilot pressure at the aperture 334, the body portion 328 moves toward the pump housing 338 to provide a working fluid pressure to the bias element 342. In the illustrated state, the application of the pilot pressure collapses the spring 320. Consequently, to maintain the gear 342 in a working state, the pilot pressure is continuously maintained.

If however, it is desired to prevent the gear 342 from pumping, the pilot pressure is removed and the spring force of the bias element 320 moves the body portion 328 away from the gear 342 and toward the cover 306. Fluid pressure is reduced and while the gear 342 may still turn, the fluid pressure is reduced sufficiently to reduce fluid flow being displaced by the pump.

In this embodiment, should the solenoid providing the pilot pressure fail to operate, the cavity 310 collapses and sufficient pressure is not available to enable the gear 342 to turn as needed. Consequently, as described herein, each of the different embodiments provides a different state of the pump when the pilot pressure is unavailable. The described embodiments, therefore, provide a relatively inexpensive, but extremely effective unloading mechanism for gear pumps when no flow and low energy states are desired, which saves one or both of power and fuel.

While exemplary embodiments incorporating the principles of the present invention have been disclosed hereinabove, the present invention is not limited to the disclosed embodiments. Instead, this application is intended to cover any variations, uses, or adaptations of the invention using its general principles. Further, this application is intended to cover such departures from the present disclosure as come within known or customary practice in the art to which this invention pertains and which fall within the limits of the appended claims.

The invention claimed is:

1. A pump assembly, comprising:
a case partially defining at least one cavity;
a ring plunger positioned within the case and slidable along a direction relative to the case between a first position and a second position;
a pump housing coupled to the case and having a gear rotatably positioned therein;
an inside wall positioned within the case and including a surface disposed substantially perpendicular to the direction, the inside wall including an aperture through which the ring plunger extends, wherein the aperture is sized to prevent a part of the ring plunger from extending through the aperture;
wherein, when fluid is provided to the at least one cavity at or above a pilot pressure, the ring plunger is positioned in the first position and when fluid is provided to the at least one cavity below the pilot pressure the ring plunger is positioned in the second position;
further wherein, in the second position the ring plunger is positioned farther from the gear than when the ring plunger is in the first position.

2. The pump assembly of claim 1, further comprising a bias member that provides a biasing force on the ring plunger towards the second position.

3. The pump assembly of claim 2, further wherein the ring member has a shaft coupled to a body portion, the shaft defining a terminating end, and the body portion is the part of the ring plunger prevented from extending through the aperture.

4. The pump assembly of claim 3, wherein the shaft extends through the aperture in the inside wall to position the terminating end on a first side of the inside wall and wherein the body portion of the ring plunger is located on a second side of the inside wall.

5. The pump assembly of claim 4, further wherein the biasing member is positioned between the terminating end and the inside wall.

6. The pump assembly of claim 5, further wherein the biasing member is a compression spring.

7. The pump assembly of claim 1, further comprising a cover coupled to the case to provide access to the at least one cavity of the case.

8. The pump assembly of claim 1, further wherein the case has an aperture and a fitting fluidly coupled to the at least one cavity and configured to provide a fluid to the at least one cavity.

9. A pump assembly, comprising:
a case partially defining a plunger cavity;
a cover coupled to the case on a first end;
a pump housing coupled to the case on a second end opposite the first end;
a ring plunger positioned within the case at least partially in the plunger cavity, the ring plunger slidable along a direction therein between a first position and a second position;
an inside wall positioned within the case and including a first side and a second side each of which are disposed substantially perpendicular to the direction, the inside wall including an aperture through which the ring plunger extends, wherein the aperture is sized to prevent a part of the ring plunger from extending therethrough;
a bias member coupled to the ring plunger to provide a biasing force on the ring plunger towards the second position, wherein the bias member is located on the first side of the inside wall;
an aperture fluidly coupling the plunger cavity to a fluid source;
wherein, when fluid is provided to the plunger cavity at or greater than a pilot pressure, the biasing force provided by the bias member is overcome by the fluid pressure in the plunger cavity to move the ring plunger to the first position;
further wherein, in the first position the pump housing provides a working pressure and in the second position the pump housing provides a fluid pressure that is less than the working pressure.

10. The pump assembly of claim 9, wherein the inside wall is positioned in the case to separate a first cavity from a second cavity.

11. The pump assembly of claim 10, further wherein the ring plunger has a shaft extending from a body portion, the shaft extending through the aperture in the inside wall to a terminating end, the bias member being positioned between the terminating end and the first side of the inside wall, wherein the body portion is located on the second side of the inside wall and is the part of the ring plunger prevented from extending through the aperture.

12. The pump assembly of claim 11, further wherein the first cavity and the second cavity are fluidly isolated from the plunger cavity.

* * * * *